(12) United States Patent
Hwang et al.

(10) Patent No.: US 7,012,741 B2
(45) Date of Patent: Mar. 14, 2006

(54) WIDEBAND AMPLIFIER WITH ERBIUM-DOPED FIBER

(75) Inventors: Seong-Taek Hwang, Pyongtaek-shi (KR); Byung-Chang Kang, Yongin-shi (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 323 days.

(21) Appl. No.: 10/425,697

(22) Filed: Apr. 29, 2003

(65) Prior Publication Data

US 2004/0114212 A1 Jun. 17, 2004

(30) Foreign Application Priority Data

Dec. 11, 2002 (KR) ...................... 10-2002-0078666

(51) Int. Cl.
*H04B 10/12* (2006.01)
(52) U.S. Cl. ..................................... 359/334
(58) Field of Classification Search ................. 359/334
See application file for complete search history.

(56) References Cited

U.S. PATENT DOCUMENTS

| | | | |
|---|---|---|---|
| 5,790,300 A * | 8/1998 | Zediker et al. ............. 359/334 |
| 6,204,960 B1 * | 3/2001 | Desurvire ............. 359/341.33 |
| 6,359,725 B1 * | 3/2002 | Islam ......................... 359/334 |
| 6,621,622 B1 * | 9/2003 | Krummrich .............. 359/337.4 |
| 6,781,748 B1 * | 8/2004 | Yeniay ..................... 359/341.1 |
| 6,819,477 B1 * | 11/2004 | Tsuzaki et al. ............. 359/334 |
| 2003/0215241 A1 * | 11/2003 | Hwang et al. ................. 398/92 |

OTHER PUBLICATIONS

Agrawa,I G. V., Fiber Optic Communication Systems, 3rd, ed. , p. 422 (May, 2002).*

* cited by examiner

*Primary Examiner*—Mark Hellner
*Assistant Examiner*—Eric Bolda
(74) *Attorney, Agent, or Firm*—Cha & Reiter, L.L.C.

(57) ABSTRACT

A wideband amplifier is provided with at least one erbium-doped fiber, for use in a wavelength division multiplexing optical communication system that performs transmission/receipt of wavelength-division-multiplexed optical signals through at least one optical fiber. The wideband amplifier comprises an erbium-doped fiber, pumped by a first pump light that pumps erbium ions and a second pump light that induces a Raman amplification, that amplifies the optical signals, a first pumping light source that outputs a predetermined wavelength of first pump light such that the erbium ions are pumped from the erbium-doped fiber, a first wavelength selective coupler that passes through optical signals amplified at the erbium-doped fiber and that inputs the first pump light into the erbium-doped fiber, a second pumping light source that outputs a predetermined wavelength of the second pump light such that a Raman pumping is performed of the erbium-doped fiber, and a second wavelength selective coupler that passes through optical signals amplified at the erbium-doped fiber and that inputs the second pump light into the erbium-doped fiber.

20 Claims, 6 Drawing Sheets

WIDEBAND AMPLIFIER WITH ERBIUM-DOPED FIBER

CLAIM OF PRIORITY

This application claims priority to an application entitled "Wideband Amplifier With Erbium-Doped fiber," filed in the Korean Intellectual Property Office on Dec. 11, 2002 and assigned Serial No. 2002-78666, the contents of which are hereby incorporated by reference.

BACKGROUND OF THE INVENTION

1. Field of the Invention

The present invention relates to an optical communication system, and in particular to a wideband amplifier with at least one erbium-doped fiber.

2. Description of the Related Art

Recent exponential growth in the volume of data transmission has necessitated increasing transmission capacity of wavelength division multiplexing (WDM) optical communication systems. There are two possible approaches for increasing transmission capacity: one is to increase the number of transmission channels, and the other is to increase the speed of transmission. Many studies have addressed increasing the transmission speed. There are two possible approaches to increasing transmission capacity: one is to use a parallel connection of a C-band erbium-doped fiber amplifier (C-band EDFA) with an L-band erbium-doped fiber amplifier (L-band EDFA), both of which are already in use, and the other is to use a new amplification medium such as a thulium-doped fiber. However, there are drawbacks to the latter approach in that optical fiber amplifiers doped with rare-earth elements are not only restricted as to available amplification band, but also have a high noise figure. As an alternative, current research is actively being directed to a Raman optical fiber amplifier.

Wavelength ranges in optical communications are generally classified as C-band, L-band and S-band. C-band has a wavelength range between 1530 nm and 1565 nm, L-band between 1565 nm and 1610 nm, and S-band between 1450 nm and 1510 nm.

FIG. 1 illustrates a configuration of a conventional optical fiber amplifier. The optical fiber amplifier includes first to fourth isolators 110, 150, 170 and 210, first and second pumping light sources 130 and 190, first and second wavelength selective couplers 120 and 180, an erbium-doped fiber 140, a connector 160 and a dispersion compensating optical fiber 200.

The first isolator 110 allows optical signals inputted in one direction to pass through but it does not allow optical signals inputted in the other direction, i.e., through the first wavelength selective coupler 120, to pass through.

The first wavelength selective coupler 120 combines optical signals inputted from the first isolator 110 with first pump light inputted from the first pumping light source 130, and then outputs the combined results to the erbium-doped fiber 140. The first pumping light source 130 pumps the erbium-doped fiber 140 in a forward direction, i.e., pumps erbium ions. In a preferred embodiment, the first pumping light source 130 comprises a laser diode for outputting the first pump light at a wavelength of 980 nm. The erbium-doped fiber 140 is pumped in a forward direction by pump light inputted through the first wavelength selective coupler 120, thereby amplifying and outputting optical signals inputted through the first wavelength selective coupler 120. The second isolator 150 allows optical signals inputted in one direction, i.e., through the erbium-doped fiber 140, to pass through but it does not allow optical signals inputted in the other direction to pass through.

The connector 160 connects an erbium-doped fiber amplifying section 220 on the leading side with a Raman optical fiber amplifying section 230 on the following side. One example of the connector 160 is a ferrule with a circular hole in its inner side.

The third isolator 170 allows optical signals inputted in one direction, i.e., through the connector 160, to pass through but it does not allow optical signals inputted in the other direction to pass through.

The second wavelength selective coupler 120 combines optical signals inputted from the third isolator 170 with a Raman pump light inputted from the second pumping light source 190, and then outputs the combined results to the dispersion compensating optical fiber 200.

The second pumping light source 190 performs a Raman-pumping of the dispersion compensating optical fiber 200 in a forward direction. In a preferred embodiment, the second pumping light source 190 comprises a laser diode for outputting the second pump light at a wavelength of 1450 nm.

The fourth isolator 210 allows optical signals inputted in one direction, i.e., through the dispersion compensating optical fiber 200, to pass through but it does not allow optical signals inputted in the other direction to pass through.

The conventional optical fiber amplifier as describe above comprises two amplifying sections 220 and 230. A first amplifying section comprises the erbium-doped fiber amplifying section 220 on the leading side of the connector 160 and the second amplifying section comprises the Raman optical fiber amplifying section 230 on the following side of the connector 160. This double arrangement diminishes the device's price competitiveness as well as increasing its total required volume, thus also diminishing its capacity for integration.

Thus, there is a need for a cost effective wideband amplifier having improved integration capability.

SUMMARY OF THE INVENTION

The present invention provides a wideband amplifier for use in a wavelength division multiplexing optical communication system that performs transmission/receipt of a wavelength-division-multiplexed optical signal through at least one optical fiber, comprising:

at least one erbium-doped fiber, pumped by a first pump light that pumps erbium ions and a second pump light that induces a Raman amplification, that amplifies the optical signal;

a first pumping light source that outputs a predetermined wavelength of the first pump light such that erbium ions are pumped from the erbium-doped fiber;

a first wavelength selective coupler that passes through the optical signal amplified at the erbium-doped fiber and that inputs the first pump light into the erbium-doped fiber;

a second pumping light source that outputs a predetermined wavelength of second pump light such that a Raman-pumping is performed of the erbium-doped fiber; and a second wavelength selective coupler that passes through the optical signal amplified at the erbium-doped fiber and that inputs the second pump light into the erbium-doped fiber.

DETAILED DESCRIPTION OF THE PREFERRED EMBODIMENT

First Embodiment

Figure 1:
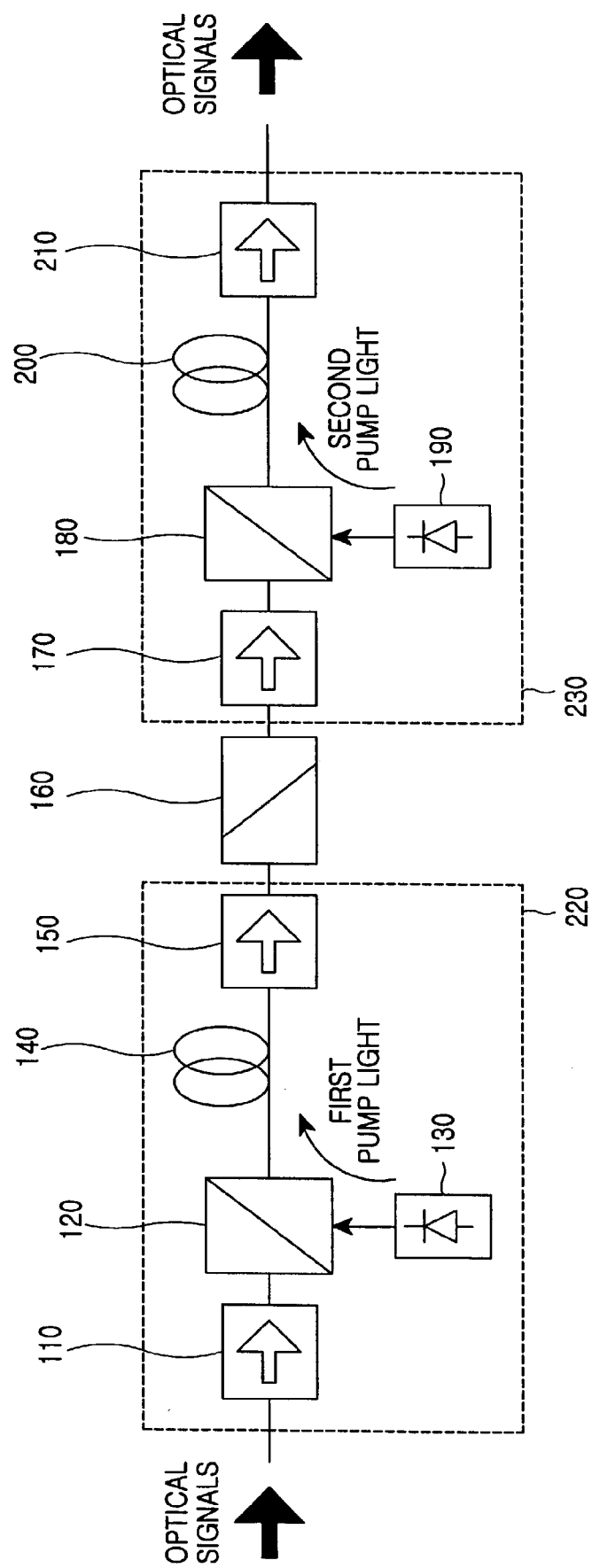
FIG. 1 illustrates a configuration of a conventional optical fiber amplifier.
Figure 2:
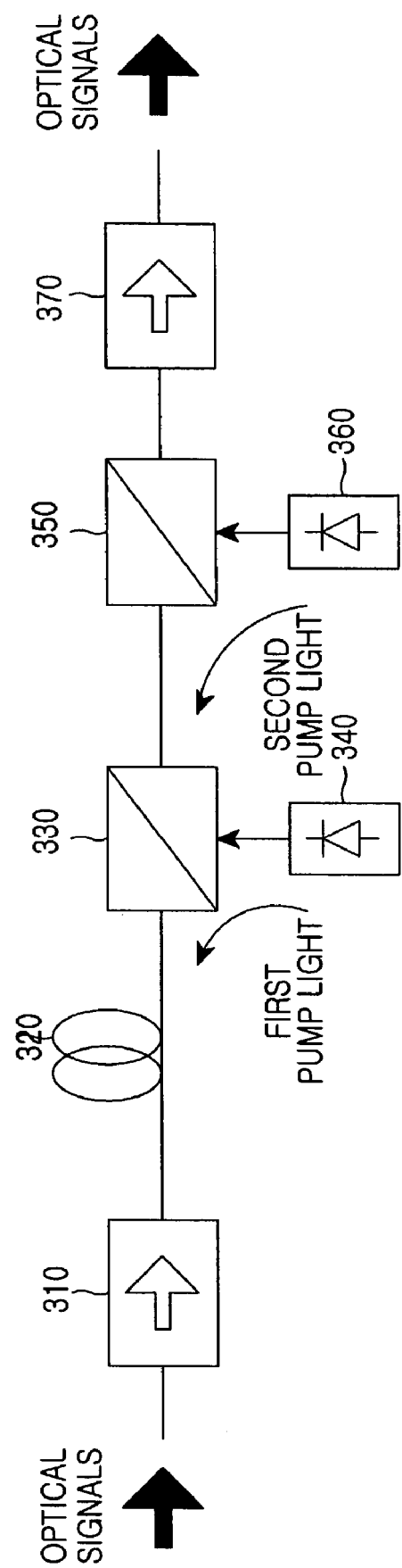
FIG. 2 illustrates a configuration of a wideband amplifier with an erbium-doped fiber according to a first embodiment of the present invention.

FIG. 2 illustrates a configuration of a wideband amplifier comprising an erbium-doped fiber according to a first embodiment of the present invention. The wideband amplifier comprises a first and second isolator 310 and 370, an erbium-doped fiber 320, a first and second wavelength selective coupler 330 and 350, and a first and second pumping light source 340 and 360.

The first isolator 310 is a device for preventing optical signals from traveling in a reverse direction, and it allows optical signals inputted in one direction to pass through but does not allow optical signals inputted in the other direction (i.e., through the erbium-doped fiber 320) to pass through.

The first pumping light source 340 pumps erbium ions from the erbium-doped fiber 320 in a backward direction and outputs a first pump light at a wavelength of 980 nm or 1480 nm, which first pump light is capable of amplifying optical signals of the C-band among all the amplifiable bands of the erbium-doped fiber. In a preferred embodiment, the first pumping light source 340 comprises a laser diode.

The first wavelength selective coupler 330 allows optical signals amplified at the erbium-doped fiber 320 to pass through and inputs the first pump light into the erbium-doped fiber 320.

The second pumping light source 360 performs a Raman-pumping of the erbium-doped fiber 320 in a backward direction, and outputs a second pump light. In a preferred embodiment, the second pumping light source 360 comprises a laser diode generating light in a wavelength range between 1350 nm and 1410 nm or between 1465 nm and 1510 nm so as to cover L-band and S-band among all the amplifiable bands of the erbium-doped fiber 320.

The second wavelength selective coupler 350 allows optical signals inputted from the erbium-doped fiber 320 to pass through and inputs the second pump light inputted from the second pumping light source 360 into the erbium-doped fiber 320.

The erbium-doped fiber 320 is pumped by the first pump light pumping erbium ions in a backward direction and by a second pump light that induces a Raman amplification in a backward direction, and such that the erbium-doped fiber 320 amplifies optical signals with different wavelength bands.

The erbium-doped fiber 320 has a length of several kilometers and an absorptance against pump light of approximately 1.0 dB/km, by setting an erbium concentration to a sufficiently low level such that a sufficient Raman gain is achieved. The erbium-doped fiber 320 allows for amplification through erbium ions as one constituent material of the erbium-doped fiber 320 and amplification through vibration energy of silica as another constituent material, concurrently.

The Raman gain at a narrow wavelength band is given by the following Equation 1:

$$G(\lambda) = \exp\left(\frac{g(\lambda)}{A_{eff}} P_p L_{eff}\right), \text{ and}$$

$$L_{eff} = \frac{1}{\alpha_p}(1 - e^{-\alpha_p L})$$

where $g(\lambda)$ is the Raman gain coefficient of the amplification medium, $P_p$ is the power of the pump light, $A_{eff}$ is the effective area with respect to the pump light, $L_{eff}$ is the effective length, L is the total length of the amplification medium, and $\alpha_p$ is the loss.

Assuming that the Raman gain coefficient, the power of the pump light and the effective length are all constant, then according to Equation 1 the Raman gain is inversely proportional to the effective area. That is, as a core of the amplification medium, i.e., a core of the optical fiber, becomes smaller, the effective area becomes smaller, and thus the Raman gain becomes greater. Typically, the effective area is 70 $\mu m^2$ for a communication optical fiber (single mode fiber), 50 $\mu m^2$ for a dispersion transition optical fiber, 20 $\mu m^2$ for a dispersion compensating optical fiber, and 15–20 $\mu m^2$ for an erbium-doped fiber. Therefore, the Raman gain obtained when the erbium-doped fiber is used as the amplification medium is similar to that obtained when the dispersion compensating optical fiber is used as the amplification medium of the Raman optical fiber amplifier.

The second isolator 370 allows optical signals inputted in one direction, i.e., through the second wavelength selective coupler 350, to pass through, but it does not allow optical signals inputted in the other direction to pass through.

Second Embodiment

Figure 3:
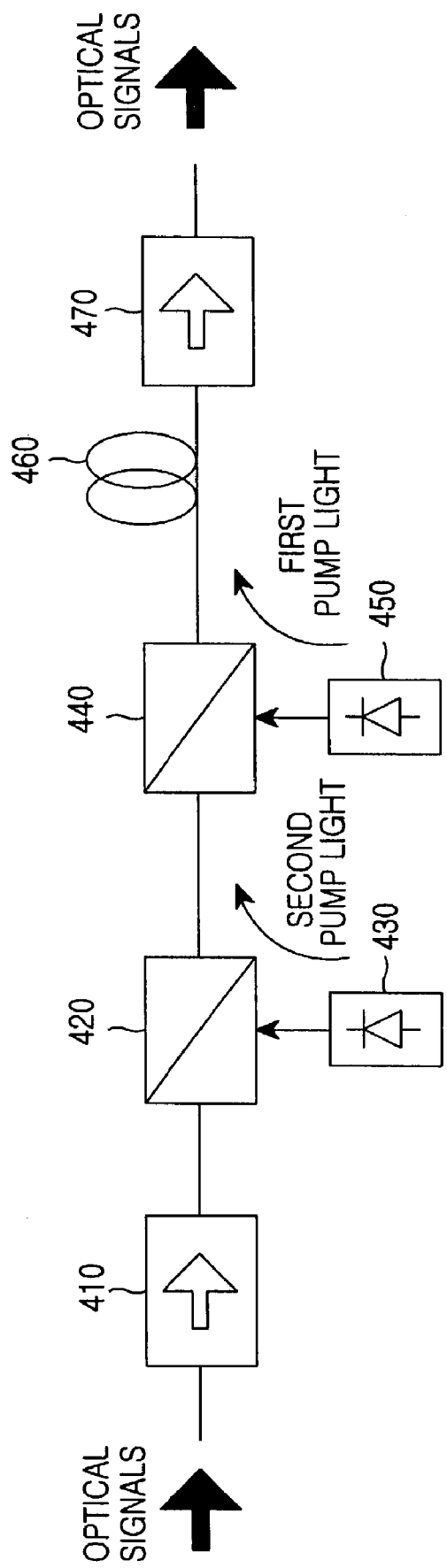
FIG. 3 illustrates a configuration of a wideband amplifier with an erbium-doped fiber according to a second embodiment of the present invention.

FIG. 3 illustrates a configuration of a wideband amplifier employing an erbium-doped fiber according to a second embodiment of the present invention wherein the wideband amplifier comprises an erbium-doped fiber 460, a first forward pumping light source 450, a first wavelength selective coupler 440, a second pumping light source 430, a second wavelength selective coupler 420, a first isolator 410, and a second isolator 470.

The first isolator 410 is a device that prevents optical signals from traveling in a reverse direction. The first isolator 410 allows optical signals inputted in one direction to pass through but it does not allow optical signals inputted in the other direction, i.e., through the second wavelength selective coupler 420, to pass through.

The first pumping light source 450 outputs a first pump light which pumps erbium ions from the erbium-doped fiber 460 in a forward direction. In a preferred embodiment, the first pumping light source 450 comprises a laser diode generating light at a wavelength of 980 nm or 1480 nm which is capable of amplifying optical signals of the C-band, among all the amplifiable bands of the erbium-doped fiber.

The first wavelength selective coupler 440 inputs the optical signals and the first pump light into the erbium-doped fiber 460.

The second pumping light source 430 outputs a second pump light which performs a Raman-pumping of the erbium-doped fiber 460 in a forward direction. In a preferred embodiment, the second pumping light source 360 comprises a laser diode generating light in a wavelength range between 1350 nm and 1410 nm or between 1465 nm and 1510 nm which is capable of amplifying optical signals of the L-band and S-band among all the amplifiable bands of the erbium-doped fiber 460.

The second wavelength selective coupler 420 inputs the optical signals and the first pump light into the erbium-doped fiber 460.

The erbium-doped fiber 460 is pumped by the first pump light pumping erbium ions in a forward direction and by second pump light for inducing a Raman amplification in a forward direction, and then it amplifies optical signals with different wavelength bands.

The erbium-doped fiber 460 amplifies optical signals (on the basis of amplification principle in the typical erbium-doped fiber amplifier). To this end, the erbium ions are pumped in a forward direction by the first pump light, and optical signals inputted at that time perform induced transition of the erbium ions. Additionally, the erbium-doped fiber 460 simultaneously allows for amplification through vibration energy of silica by means of the second pump light, in which silica is another constituent material of the erbium-doped fiber.

The second isolator 470 allows optical signals inputted in one direction, i.e., through the erbium-doped fiber 460, to pass through but it does not allow optical signals inputted in the other direction to pass through.

Third Embodiment

Figure 4:
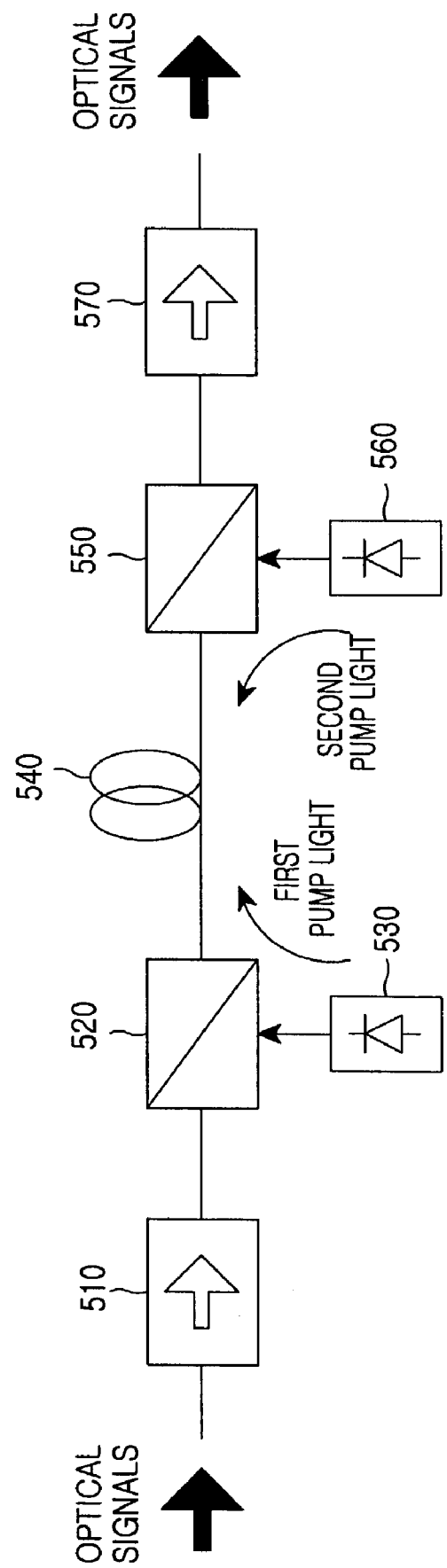
FIG. 4 illustrates a configuration of a wideband amplifier with an erbium-doped fiber according to a third embodiment of the present invention.

FIG. 4 illustrates a configuration of a wideband amplifier employing an erbium-doped fiber according to a third embodiment of the present. The wideband amplifier comprises an erbium-doped fiber 540, a first forward pumping light source 530, a first wavelength selective coupler 520, a second backward pumping light source 560, a second wavelength selective coupler 550, a first isolator 510, and a second isolator 570.

The first isolator 510 prevents reverse transmission of externally inputted optical signals. The first isolator 510 allows optical signals inputted in one direction to pass through but it does not allow optical signals inputted in the other direction, i.e., through the first wavelength selective coupler 520, to pass through.

The first pumping light source 530 outputs a first pump light which pumps erbium ions from the erbium-doped fiber 540 in a forward direction. The first wavelength selective coupler 520 inputs the optical signals inputted through the first isolator 510 and the first pump light into the erbium-doped fiber 540.

The second pumping light source 560 outputs a second pump light that performs a Raman-pumping of the erbium-doped fiber 540 in a backward direction. In a preferred embodiment, the second pumping light source 560 comprises a laser diode generating light in a wavelength range between 1350 nm and 1410 nm or between 1465 nm and 1510 nm which is capable of amplifying optical signals of the L-band and S-band among all the amplifiable bands of the erbium-doped fiber 460.

The second wavelength selective coupler 550 allows optical signals outputted from the erbium-doped fiber 540 to pass through and inputs the second pump light outputted from the second pumping light source 560 into the erbium-doped fiber 540.

The erbium-doped fiber 540 is pumped by the first pump light pumping erbium ions in a forward direction and by the second pump light that induces a Raman amplification in a backward direction, such that the erbium-doped fiber amplifies optical signals with different wavelength bands.

The erbium-doped fiber 540 allows for pumping of the erbium ions b y the first pump light as well as a Raman amplification by the second pump light (on the basis of the amplification principle of Raman optical fiber amplifier) concurrently.

The second isolator 570 allows optical signals inputted in one direction (i.e., through the second wavelength selective coupler 550) to pass through but it does not allow optical signals inputted in the other direction to pass through.

Fourth Embodiment

Figure 5:
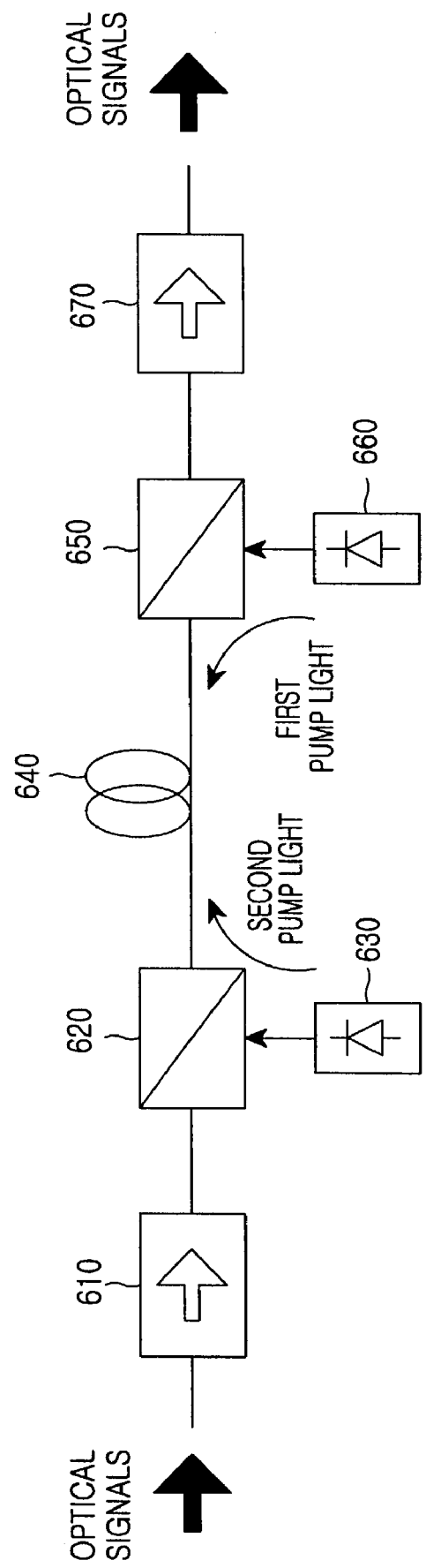
FIG. 5 illustrates a configuration of a wideband amplifier with an erbium-doped fiber according to a fourth embodiment of the present invention.

FIG. 5 illustrates a configuration of a wideband amplifier employing an erbium-doped fiber according to a fourth embodiment of the present invention. The wideband amplifier comprises an erbium-doped fiber 640, a second pumping light source 630, a second wavelength selective coupler 620, a first pumping light source 660, a first wavelength selective coupler 650, a first isolator 610, and a second isolator 670.

The first isolator 610 prevents reverse transmission of externally inputted optical signals. The first isolator 610 allows optical signals inputted in one direction to pass through but it does not allow optical signals inputted in the other direction, i.e., through the second wavelength selective coupler 620, to pass through.

The second pumping light source 630 outputs a second pump light which performs a Raman-pumping of the erbium-doped fiber 540 in a forward direction. In a preferred embodiment, the second pumping light source 560 comprises a laser diode generating light in a wavelength range between 1350 nm and 1410 nm or between 1465 nm and 1510 nm which is capable of amplifying optical signals of the L-band and S-band, among all the amplifiable bands of the erbium-doped fiber 640.

The second wavelength selective coupler 620 inputs optical signals inputted through the first isolator 610 and the second pump light into the erbium-doped fiber 640.

The first pumping light source 660 outputs a first pump light that pumps erbium ions from the erbium-doped fiber 640 in a backward direction. In a preferred embodiment, the first pumping light source 660 comprises a laser diode generating light at a wavelength of 980 nm which is capable of amplifying optical signals of the C-band among all the amplifiable bands of the erbium-doped fiber 640.

The first wavelength selective coupler 650 allows optical signals outputted from the erbium-doped fiber 640 to pass through and inputs the first pump light into the erbium-doped fiber 640.

The erbium-doped fiber 640 is pumped by a second pump light that induces a Raman amplification in a forward direction and by the first pump light that pumps erbium ions in a backward direction, such that the erbium-doped fiber 640 amplifies optical signals with different wavelength bands.

The erbium-doped fiber 640 allows for a Raman amplification by the second pump light (on the basis of the amplification principle of Raman optical fiber amplifier). Further, the first pump light pumps erbium ions in a backward direction, thus amplifying optical signals (on the basis of the amplification principle of the typical erbium-doped fiber amplifier).

The second isolator 670 allows optical signals inputted in one direction, i.e., through the first wavelength selective coupler 650, to pass through but it does not allow optical signals inputted in the other direction to pass through.

Fifth Embodiment

Figure 6:
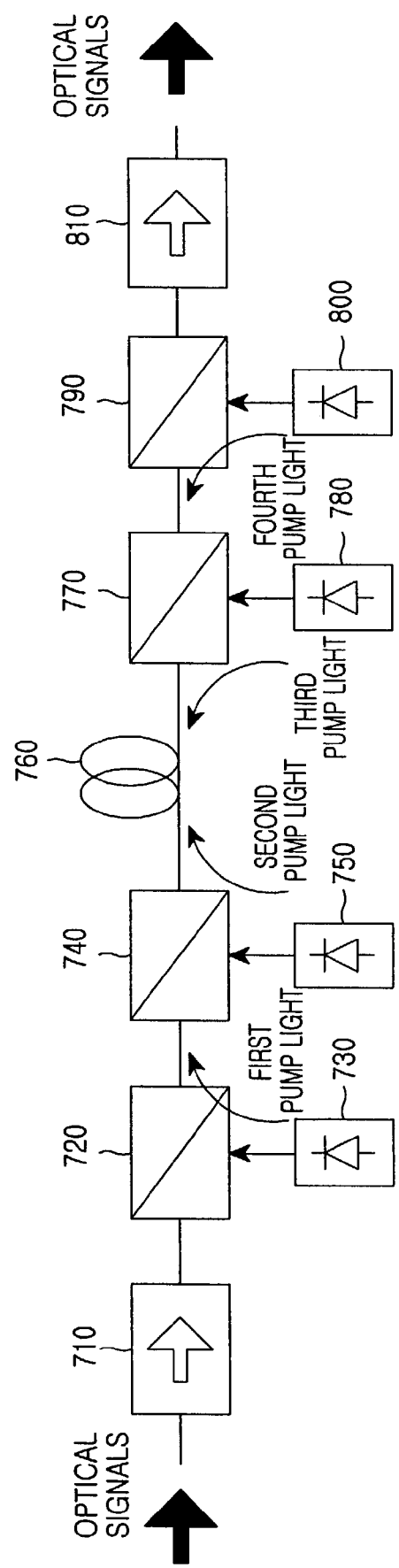
FIG. 6 illustrates a configuration of a wideband amplifier with an erbium-doped fiber according to a fifth embodiment of the present invention.

FIG. 6 illustrates a configuration of a wideband amplifier employing an erbium-doped fiber according to a fifth embodiment of the present invention. The wideband amplifier comprises an erbium-doped fiber 760, a first pumping light source 730 that performs a Raman amplification in a forward direction, a first wavelength selective coupler 720, a second pumping light source 750 that pumps erbium ions in a forward direction, a second wavelength selective coupler 740, a third pumping light source 780 that pumps erbium ions in a backward direction, a third wavelength selective coupler 770, a fourth pumping light source 800 that performs a Raman amplification in a backward direction, a fourth wavelength selective coupler 790, a first isolator 710, and a second isolator 810.

The first isolator 710 prevents reverse transmission of externally input optical signals. The first isolator 710 allows optical signals inputted in one direction to pass through but it does not allow optical signals inputted in the other direction, i.e., through the first wavelength selective coupler 720, to pass through.

The second pumping light source 750 outputs a second pump light that pumps erbium ions from the erbium-doped fiber 760 in a forward direction. In a preferred embodiment, the second pumping light source 750 comprises a laser diode generating light at a wavelength of 980 nm which is capable of amplifying optical signals of the C-band among all the amplifiable bands of the erbium-doped fiber 760.

The first pumping light source 730 outputs a first pump light that performs a Raman-pumping of the erbium-doped fiber 760 in a forward direction. In a preferred embodiment, the first pumping light source 730 comprises a laser diode generating light belonging to a wavelength range between 1350 nm and 1410 nm or between 1465 nm and 1510 nm which is capable of amplifying optical signals of the L-band and S-band, among all the amplifiable bands of the erbium-doped fiber 760.

The third pumping light source 780 outputs a third pump light that pumps erbium ions from the erbium-doped fiber 760 in a backward direction.

The fourth pumping light source 800 outputs a fourth pump light that performs a Raman-pumping of the erbium-doped fiber 760 in a backward direction. In a preferred embodiment, the fourth pumping light source 800 comprises a laser diode generating light belonging to a wavelength range between 1350 nm and 1410 nm or between 1465 nm and 1510 nm which is capable of amplifying optical signals of the L-band and S-band, among all the amplifiable bands of the erbium-doped fiber 760.

The second and third pumping light sources 750 and 780 output a second and third pump light that amplifies optical signals with the wavelength band of the C-band by pumping erbium ions from the erbium-doped fiber 760, in which the second pump light is inputted into the erbium-doped fiber 760 in a forward direction, while the third pump light is inputted into the erbium-doped fiber 760 in a backward direction.

Further, the first and fourth pumping light sources 730 and 800 output a first and fourth pump light that perform a Raman amplification of the wavelength band of the S-band or L-band using vibration energy of silica comprising the erbium-doped fiber 760, in which the first pump light is inputted into the erbium-doped fiber 760 in a forward direction, while the fourth pump light is inputted into the erbium-doped fiber 760 in a backward direction.

The first and second wavelength selective couplers 720 and 740 input the first pump light and the second pump light, respectively, together with optical signals into the erbium-doped fiber 760. The third and fourth wavelength selective couplers 770 and 790 input the first pump light and the second pump light, respectively, into the erbium-doped fiber 760, and allow optical signals amplified at the erbium-doped fiber 760 to pass through.

In preferred embodiments, these pumping light sources may be configured in various ways by combinations of laser diodes with different wavelength bands.

The erbium-doped fiber 760 is pumped by the second pump light that pumps erbium ions in a forward direction, by the third pump light that pumps erbium ions in a backward direction, by the first pump light that induces a Raman amplification in a forward direction and by the fourth pump light that induces a Raman amplification in a backward direction, such that the erbium-doped fiber 760 amplifies optical signals with different wavelength bands.

As can be seen from the foregoing, the wideband amplifier according to the present invention makes use of the erbium-doped fiber as amplification medium not only for the erbium-doped fiber amplifier, but also for the Raman amplifier, such that the wideband amplifier provides a cost effective and integrated system. Furthermore, the wideband amplifier employs the separated pumping light sources that perform a Raman amplification and pump erbium ions, thus improving output of the wideband amplifier and coping with a communication environment in a more active manner.

What is claimed is:

1. A wideband amplifier for use in a wavelength division multiplexing optical communication system that at least one of transmits and receives wavelength-division-multiplexed optical signals through at least one optical fiber, comprising:

at least one erbium-doped fiber, pumped by a first pump light that pumps erbium ions and a second pump light that induces a Raman amplification, such that the at least one erbium-doped fiber amplifies the optical signals;

a first pumping light source that outputs a predetermined wavelength of the first pump light such that the erbium ions are pumped from the erbium-doped fiber;

a first wavelength selective coupler that passes through optical signals amplified by the erbium-doped fiber and that inputs the first pump light into the erbium-doped fiber;

a second pumping light source that outputs a predetermined wavelength of the second pump light such that a Raman pumping is performed of the erbium-doped fiber; and a second wavelength selective coupler that passes through optical signals amplified by the erbium-doped fiber and that inputs the second pump light into the erbium-doped fiber.

2. The wideband amplifier according to claim 1, further comprising:

a first isolator that prevents optical signals inputted through the optical fiber from traveling in a reverse direction; and a second isolator that prevents optical signals outputted through the optical fiber from traveling in a reverse direction.

3. The wideband amplifier according to claim 1, wherein the first pumping light source has a wavelength selected from the group consisting of 980 nm and 1480 nm and pumps the erbium-doped fiber in a backward direction to amplify optical signals of the C-band.

4. The wideband amplifier according to claim 1, wherein the second pumping light source has a wavelength range selected from the group consisting of 1350 nm to 1410 nm and 1465 nm to 1510 nm and pumps the erbium-doped fiber in a backward direction to amplify optical signals of the L-band and S-band.

5. The wideband amplifier according to claim 4, wherein the second pumping light source is a laser diode.

6. The wideband amplifier according to claim 1, wherein the erbium-doped fiber causes concentration of erbium ions to be set so that the first and second pump light each have an absorptance of approximately 1.0 dB/km.

7. The wideband amplifier according to claim 1, wherein the erbium-doped fiber further comprises silica such that it concurrently amplifies the optical signals through erbium ions as one constituent material of the erbium-doped fiber and through vibration energy of silica as another constituent material of the erbium-doped fiber.

8. The wideband amplifier according to claim 1, wherein: the Raman gain at a narrow wavelength band is given by the equation $$G(\lambda) = \exp\left(\frac{g(\lambda)}{A_{eff}} P_p L_{eff}\right), \text{ and}$$

$$L_{eff} = \frac{1}{\alpha_p}(1 - e^{-\alpha_p L})$$

wherein $g(\lambda)$ is the Raman gain coefficient of the erbium-doped fiber, $P_p$ is the power of the second pumping light, $A_{eff}$ is the effective area with respect to the second pump light, $L_{eff}$ is the effective length, L is the total length of the erbium-doped fiber, and $\alpha_p$ is the loss.

9. A wideband amplifier for use in a wavelength division multiplexing optical communication system for at least one of transmits and receives wavelength-division-multiplexed optical signals through at least one optical fiber, comprising:
    at least one erbium-doped fiber, pumped by a first pump light that pumps erbium ions and a second pump light that induces a Raman amplification, that amplifies the optical signals;
    a first pumping light source for outputting a predetermined wavelength of a first pump light such that the erbium ions of the erbium-doped fiber are pumped in a forward direction;
    a first wavelength selective coupler for inputting the optical signals and the first pump light into the erbium-doped fiber;
    a second pumping light source for outputting a predetermined wavelength of a second pump light such that a Raman pumping is performed of the erbium-doped fiber in a forward direction; and
    a second wavelength selective coupler for inputting the optical signals and the second pump light into the erbium-doped fiber.

10. The wideband amplifier according to claim 9, further comprising:
    a first isolator that prevents optical signals inputted through the optical fiber from traveling in a reverse direction; and
    a second isolator that prevents optical signals outputted through the optical fiber from traveling in a reverse direction.

11. The wideband amplifier according to claim 9, wherein the first pumping light source has a wavelength of 980 nm and pumps the erbium-doped fiber in a forward direction to amplify optical signals of the C-band.

12. The wideband amplifier according to claim 9, wherein the second pumping light source has a wavelength range selected from the group consisting of 1350 nm to 1410 nm and 1465 nm to 1510 nm and pumps the erbium-doped fiber in a forward direction to amplify optical signals of the L-band and S-band.

13. The wideband amplifier according to claim 12, wherein the second pumping light source is a laser diode.

14. A wideband amplifier for use in a wavelength division multiplexing optical communication system that at least one of transmits and receives wavelength-division-multiplexed optical signals through at least one optical fiber, comprising:
    at least one erbium-doped fiber, pumped by a first pump light that pumps erbium ions and a second pump light that induces a Raman amplification, that amplifies the optical signals;
    a first pumping light source that outputs a predetermined wavelength of the first pump light such that the erbium ions of the erbium-doped fiber are pumped in a forward direction;
    a first wavelength selective coupler that inputs the optical signals and the first pump light into the erbium-doped fiber;
    a second pumping light source that outputs a predetermined wavelength of the second pump light such that a Raman pumping is performed of the erbium-doped fiber in a forward direction; and
    a second wavelength selective coupler that passes through optical signals amplified at the erbium-doped fiber and that inputs the second pump light into the erbium-doped fiber.

15. The wideband amplifier according to claim 14, further comprising:
    a first isolator that prevents optical signals inputted through the optical fiber from traveling in a reverse direction; and
    a second isolator that prevents optical signals outputted through the optical fiber from traveling in a reverse direction.

16. The wideband amplifier according to claim 14, wherein the second pumping light source has a wavelength range selected from the group consisting of 1350 nm to 1410 nm and 1465 nm to 1510 nm and pumps the erbium-doped fiber in a backward direction to amplify optical signals of the L-band and S-band.

17. The wideband amplifier according to claim 16, wherein the second pumping light source is a laser diode.

18. A wideband amplifier for use in a wavelength division multiplexing optical communication system that at least one of transmits and receives wavelength-division-multiplexed optical signals through at least one optical fiber, comprising:
    at least one erbium-doped fiber, pumped by a first pump light that pumps erbium ions and a second pump light that induces a Raman amplification, that amplifies the optical signals;
    a first pumping light source that outputs a predetermined wavelength of the first pump light such that the erbium ions of the erbium-doped fiber are pumped in a backward direction;
    a first wavelength selective coupler that passes through optical signals amplified at the erbium-doped fiber and that inputs the first pump light into the erbium-doped fiber;

a second pumping light source that outputs a predetermined wavelength of second pump light such that a Raman pumping of the erbium-doped fiber is performed in a forward direction; and a second wavelength selective coupler that inputs the optical signals and the second pump light into the erbium-doped fiber.

19. The wideband amplifier according to claim 18, further comprising:

a first isolator that prevents optical signals inputted through the optical fiber from traveling in a reverse direction; and a second isolator that prevents optical signals outputted through the optical fiber from traveling in a reverse direction.

20. A wideband amplifier for use in a wavelength division multiplexing optical communication system that at least one of transmits and receives wavelength-division-multiplexed optical signals through at least one optical fiber, comprising:

at least one erbium-doped fiber, pumped by a second and a third pump light that pump erbium ions and by a first and a fourth pump light that induces a Raman amplification, that amplifies the optical signals;

a second pumping light source that outputs a predetermined wavelength of the second pump light such that the erbium ions of the erbium-doped fiber are pumped in a forward direction;

a second wavelength selective coupler that inputs the optical signals and the second pump light into the erbium-doped fiber;

a first pumping light source that outputs a predetermined wavelength of the first pump light such that a Raman pumping of the erbium-doped fiber is performed in a forward direction;

a first wavelength selective coupler that inputs the optical signals and the first pump light into the erbium-doped fiber;

a third pumping light source that outputs the third pump light such that erbium ions of the erbium-doped fiber are pumped in a backward direction, using a laser diode with a different wavelength from the second pump light;

a third wavelength selective coupler that passes through optical signals amplified at the erbium-doped fiber and that inputs the third pump light into the erbium-doped fiber;

a fourth pumping light source that outputs the fourth pump light such that a Raman pumping of the erbium-doped fiber is performed in a backward direction, using a laser diode with a different wavelength from the first pump light; and a fourth wavelength selective coupler that passes through optical signals amplified at the erbium-doped fiber and that inputs the fourth pump light into the erbium-doped fiber.

* * * * *